US009561638B2

(12) United States Patent
Jeunesse et al.

(10) Patent No.: US 9,561,638 B2
(45) Date of Patent: Feb. 7, 2017

(54) METHOD OF MANUFACTURING A PIECE OF AUTOMOTIVE VEHICLE EQUIPMENT AND ASSOCIATED PIECE OF EQUIPMENT

(71) Applicant: Faurecia Automotive Industrie, Nanterre (FR)

(72) Inventors: Stève Jeunesse, Mouzon (FR); Valérie Marcel, Bradenville (FR)

(73) Assignee: Faurecia Automotive Industrie, Nanterre (FR)

( * ) Notice: Subject to any disclaimer, the term of this patent is extended or adjusted under 35 U.S.C. 154(b) by 0 days.

(21) Appl. No.: 14/384,125

(22) PCT Filed: Mar. 5, 2013

(86) PCT No.: PCT/EP2013/054409
§ 371 (c)(1),
(2) Date: Sep. 9, 2014

(87) PCT Pub. No.: WO2013/131917
PCT Pub. Date: Sep. 12, 2013

(65) Prior Publication Data
US 2015/0056430 A1 Feb. 26, 2015

(30) Foreign Application Priority Data
Mar. 9, 2012 (FR) .................................. 12 52147

(51) Int. Cl.
*B32B 5/02* (2006.01)
*B32B 27/10* (2006.01)
*B32B 27/12* (2006.01)
*B29C 43/18* (2006.01)
*B32B 3/12* (2006.01)
*B32B 27/36* (2006.01)
*B32B 29/00* (2006.01)
*B29D 7/01* (2006.01)
*B32B 37/18* (2006.01)
*B29K 67/00* (2006.01)
*B29K 105/00* (2006.01)
*B29K 105/12* (2006.01)
*B29K 309/02* (2006.01)
*B29K 601/00* (2006.01)

(52) U.S. Cl.
CPC .............. *B32B 5/02* (2013.01); *B29C 43/183* (2013.01); *B29D 7/01* (2013.01); *B32B 3/12* (2013.01); *B32B 27/10* (2013.01); *B32B 27/12* (2013.01); *B32B 27/36* (2013.01); *B32B 29/005* (2013.01); *B32B 37/185* (2013.01); *B29K 2067/003* (2013.01); *B29K 2105/0067* (2013.01); *B29K 2105/12* (2013.01); *B29K 2309/02* (2013.01); *B29K 2601/00* (2013.01); *B29K 2713/00* (2013.01); *B29K 2715/003* (2013.01); *B29K 2995/004* (2013.01); *B32B 2250/03* (2013.01); *B32B 2250/40* (2013.01); *B32B 2262/105* (2013.01); *B32B 2305/026* (2013.01); *B32B 2305/22* (2013.01); *B32B 2307/704* (2013.01); *B32B 2315/02* (2013.01); *B32B 2317/18* (2013.01); *B32B 2367/00* (2013.01); *B32B 2605/00* (2013.01); *B32B 2605/08* (2013.01); *Y10T 428/2495* (2015.01)

(58) Field of Classification Search
None
See application file for complete search history.

(56) References Cited

U.S. PATENT DOCUMENTS

| | | | | |
|---|---|---|---|---|
| 3,274,046 A | * | 9/1966 | Shannon | B29C 44/32 156/79 |
| 4,933,131 A | | 6/1990 | Okey et al. | |
| 6,221,291 B1 | * | 4/2001 | Van Ert | B29B 11/12 264/112 |
| 2003/0003267 A1 | | 1/2003 | Alts et al. | |
| 2005/0224637 A1 | | 10/2005 | Fabian et al. | |
| 2006/0141260 A1 | * | 6/2006 | Haque | B32B 5/02 428/412 |
| 2006/0240242 A1 | * | 10/2006 | Raghavendran | B32B 5/02 428/304.4 |
| 2008/0045101 A1 | * | 2/2008 | Near | B32B 5/26 442/35 |

(Continued)

FOREIGN PATENT DOCUMENTS

EP 0628406 A2 12/1994
EP 2311629 A1 4/2011

(Continued)

OTHER PUBLICATIONS

International Search Report (translated) for application No. PCT/EP2013/054409, dated Jun. 5, 2013, 3 pages.
Written Opinion (translated) for application No. PCT/EP2013/054409, dated Jun. 5, 2013, 8 pages.

*Primary Examiner* — Barbara J Musser
(74) *Attorney, Agent, or Firm* — Reising Ethington P.C.

(57) ABSTRACT

This method includes the arrangement of a first sheet (22A) of porous material on a first face (18) of a base layer and of a second sheet (22B) of porous material of a second face (20) of the base layer before a heating step. Each sheet (22A, 22B) of porous material has a thickness of less than that of the formed layer (16).

The sheets (22A, 22B) of porous material confine between them the molten polymeric material derived from the heat fusible polymer fibers during the heating step. The sheets (22A, 22B) of porous material are bound to the formed layer (16) after the step for building up the formed layer (16), in order to make up a first composite body (12A).

14 Claims, 4 Drawing Sheets

(56) References Cited

U.S. PATENT DOCUMENTS

2011/0147119 A1* 6/2011 Cao .................... B32B 37/1284
181/292

FOREIGN PATENT DOCUMENTS

| FR | 2580991 A1 | 10/1986 |
|----|-----------|---------|
| FR | 2860450 A1 | 4/2005 |
| FR | 2933894 A1 | 1/2010 |
| JP | 2007283680 A | 11/2008 |

* cited by examiner

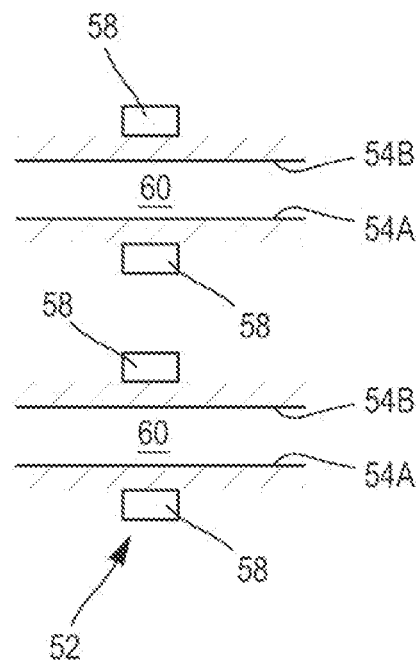
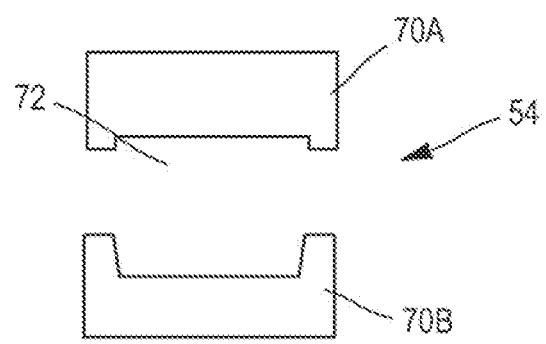
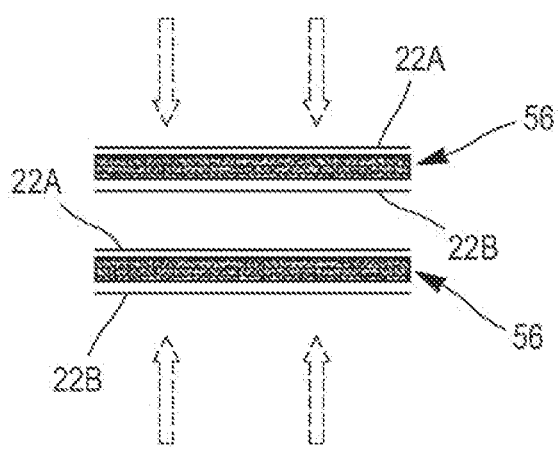

METHOD OF MANUFACTURING A PIECE OF AUTOMOTIVE VEHICLE EQUIPMENT AND ASSOCIATED PIECE OF EQUIPMENT

TECHNICAL FIELD

The present invention relates to a method for manufacturing an equipment part of automotive vehicle, comprising the following steps:
- providing a base layer including ceramic fibers and heat fusible polymer fibers;
- heating and compressing the base layer on at least one supporting wall for melting the heat fusible polymer fibers and for having the molten polymer adhere to the ceramic fibers in order to obtain a preformed layer;
- confining the preformed layer in a pressurized mold in order to make up a formed layer, the polymer of the formed layer being advantageously at least partly crystallized.

The part is intended to form a structuring part in an automotive vehicle, such as a shelf, a raised floor.

BACKGROUND

A known part comprises a composite body including a layer of ceramic fibers, for example glass fibers, the ceramic fibers being embedded in a thermoplastic polymeric matrix such as polypropylene.

This type of material is designated by the commercial term of "Sommold".

In order to easily make this part, the usual method of the aforementioned type is known. In this method, a base mat comprising a mixture of ceramic fibers and polypropylene fibers is cut out beforehand to the form of the desired part.

Next, the mat is introduced between two heated plates which transmit the calories by conduction and by convection of the air trapped in the mat. This gives the possibility of rapidly and easily heating the base mat in order to cause melting of the polypropylene fibers. Next, the layer formed with the molten polymer is transferred into a cold mold which closes and compresses this layer down to the required thickness. The polypropylene flows through the glass fibers and forms, after cooling, the polymer matrix of the composite body which has the desired thickness, and the intended shape. The heating step before introduction into the mold simplifies the operation of the mold which does not have to be thermally regulated and reduces the cycle time, the preheating operation being performed in masked time during the molding operation per se.

The thereby produced composite body may be used as such, be assembled with a composite body of the same nature and form "double shell" parts or further be assembled on a honeycomb spacer in order to produce a composite part of the sandwich type. These parts receive in the majority of the cases, a cladding most often of the carpet type, either tufted or needled.

Generally, the mass proportion of glass fibers and of polypropylene fibers in the base mat is of the order of 50%.

The parts obtained by this method does not always give entire satisfaction. In certain applications, the requirements sheet for the part in particular implies resistance at a high temperature, being expressed by very low deflections under load, in particular at temperatures above 85° C. For example, this is the case for rear shelves of an automotive vehicle which are subject to temperatures of this order when the vehicle remains exposed to the sun for a long period of time.

Another drawback of Sommold parts lies in the fact that the technique for making the mat causes a certain number of glass fibers to be found oriented perpendicular to the plane of the mat. These poorly oriented glass fibers are again found even after molding within the finished part and may pierce the cladding thereby causing irritations for the operators and possibly for the final users.

In order to overcome this high temperature behavior problem of the composites based on ceramic fibers, the use, instead of polyolefin fibers, of a thermosetting polymer capable of crosslinking for generating three dimensional bridges between the macromolecular chains is known. Thermosetting polymers generally have high elastic moduli and a good high temperature behavior, with low creep. They are however difficult to recycle and the conformation of the thermosetting polymeric matrix may be complicated to apply industrially, essentially because of the duration of crosslinking which induces a high cycle time.

A thermosetting polymer family is very often associated with ceramic fibers and the family of unsaturated polyesters. Thus the term of GRP (glass-fiber reinforced plastic) in the majority of the cases makes reference to composites based on glass fibers reinforced with thermosetting unsaturated polyester resins. GRPs have been used for a long time as skins in sandwiched structures such as described in FR 2 580 991.

EP 0 628 406 proposes the use of different thermosetting resin types for producing skins of a structuring part of the sandwich type. Further, adhesion with the spacer is proposed so as to be achieved with resin which expands as a foam in order to partly penetrate into the spacer which allows reinforcement of the latter and ensures good adhesion with the skins.

Alternatively, EP-2 311 629 describes a structuring part of an automotive vehicle including a central spacer including a central spacer and two polymeric bodies attached on either side of the central spacer. Each body is obtained on the basis of two-component fibers in polyethylene terephthalate. In this case, the matrix as well as the reinforcement fibers are formed by a thermoplastic saturated polyester while the honeycomb spacer is also based on thermoplastic polyester. Because the spacer and the skins are of the same chemical nature, their adhesion may be strong which contributes to improving the flexural behavior. This product is easily recyclable since it is based on a single type of polymer.

Nevertheless, the method for applying these parts passes through a coating step which requires specific equipment and requires extrusion of two-component fibers which remains an expensive method. Moreover the elastic modulus of the terephthalate polyester fibers used as a reinforcement remains considerably less than that of the glass leading to composites of lesser performances.

SUMMARY

An object of the invention is to obtain a method for making structural parts of an automotive vehicle which has improved mechanical properties, the method being simple to apply and not very expensive. Another object of the invention is to obtain a method leading to recyclable parts and for which the surface will be totally free of irritating fibers.

In particular, when the structural part are made by associating two composite bodies placed on either side of a spacer, these improved performances will be obtained by the good characteristics of the composite bodies per se as well as by the quality of the composite body/spacer interface.

For this purpose, there is provided herein a method of the aforementioned type, characterized in that the method includes the positioning of a first sheet of porous material on a first face of the base layer and a second sheet of porous material on a second face of the base layer before the heating step, each sheet of porous material having a thickness of less than that of the formed layer, the sheets of porous material confining together the molten polymer material stemming from the heat fusible polymer fibers during the heating step, the sheets of porous material being bound to the formed layer after the step for forming the shaped layer, in order to form a first composite body.

The method according to invention may comprise one or several of the following features, taken individually or according to all technically possible combinations:

- the heat fusible polymer includes a melt flow index greater than 20 g/10 mins at 260° C. and in particular comprised between 30 g/10 mins and 60 g/10 mins;
- each sheet of porous material has a surface mass of less than 100 g/m$^2$, advantageously less than 85 g/m$^2$, in particular less than 60 g/m$^2$;
- the first sheet of porous material and the second sheet of porous material is formed with paper or with a planar web of mechanically bound fibers or bound by a resin;
- the surface tension of the first sheet and/or the second sheet is less than 60 dynes/cm, and is in particular comprised between 40 dynes/cm and 60 dynes/cm;
- the wettability of the first sheet and/or of the second sheet, measured by its COBB 60 index determined according to the ISO 535 standard, is comprised between 50% and 100%, advantageously between 80% and 100% of the surface mass of said sheet;
- the airflow resistance of the first sheet and/or of the second sheet is greater than 25 N·s/m$^3$ and is in particular comprised between 25 N·s/m$^3$ and 100 N·s/m$^3$;
- the first sheet is made on the basis of paper, the second sheet being made on the basis of a planar web of fibers either bound mechanically or by a resin, advantageously a web of ceramic material;
- the heat fusible polymer fibers are advantageously fibers containing polyester, in particular fibers containing polyethylene terephthalate;
- after the heating step, the maximum penetration thickness of the molten polymer in each sheet of porous material is less than 90% of the thickness of the sheet of porous material and is advantageously comprised between 50% and 90% of the thickness of the sheet;

It includes the making of a second composite body, advantageously with the same steps as the ones used for making the first composite body,

- the method including the attachment of the first composite body and of the second body onto opposite faces of an intermediate spacer, advantageously an intermediate spacer in a fiber material;
- during the heating step, the heating temperature of the base layer is greater than 140° C. and is in particular greater than 200° C.;
- it comprises, after the heating step, a step for displacement of the layer formed in a mold advantageously regulated to a constant temperature, the conformation step being carried out in this mold;
- the compression of the base layer is carried out between two supporting walls facing each other, delimiting between them an intermediate space;
- the part includes a first composite body;
- the part is obtained form a first composite body;

The object of the invention is also an equipment part of an automotive vehicle characterized in that it includes at least one composite body including a layer formed with ceramic fibers bound to each other with a polymeric matrix which is advantageously at least partly crystallized, obtained from heat fusible polymer fibers, the composite body comprising a first sheet of porous material positioned on a first face of the layer formed and a second sheet of porous material positioned on a second face of the layer formed, each porous material sheet having a thickness of less than that of the formed layer, the polymeric material matrix being confined between the sheets of porous material, each sheet of porous material being bound to the layer formed.

The part according to the invention may comprise one or more of the following features, taken individually or according to all technically possible combinations:

- each sheet of porous material has a surface mass of less than 100 g/m$^2$, advantageously less than 85 g/m$^2$, in particular less than 60 g/m$^2$;
- each sheet of porous material is selected from a sheet of paper, and a planar web of mechanically bound fibers or bound with a resin;
- the heat fusible polymer has a melt flow index at 260° C. greater than 20 g/10 mins and advantageously comprised between 30 g/10 mins and 60 g/10 mins;
- the matrix obtained from the heat fusible polymer fibers contains a polyester, in particular polyethylene terephthalate;
- it includes a first composite body and a second composite body, each composite body including a formed layer comprising ceramic fibers bound together with a polymeric material matrix, advantageously at least partly crystallized, obtained from heat fusible polymer fibers, each composite body comprising a first sheet of porous material attached onto a first face of the layer formed and a second sheet of porous material attached onto a second face of the layer formed, each sheet of porous material having a thickness of less than that of the layer formed, the polymeric material matrix being confined between the sheets of porous material, each porous material sheet being bound to the layer formed,
- the first composite body and the second composite body being attached onto a spacer, in particular a spacer in a fiber material such as a cardboard spacer;
- the surface tension of the first sheet and/or if the second sheet is less than 60 dynes/cm and is in particular comprised between 40 dynes/cm and 60 dynes/cm;
- the wettability of the first sheet and/or of the second sheet, measured by its COBB 60 index determined according to the ISO 535 standard, is comprised between 50% and 100%, advantageously between 80% and 100% of the surface mass of said sheet;
- the airflow resistance of the first sheet and/or of the second sheet is greater than 25 N·s/m$^3$ and is in particular comprised between 25 N·s/m$^3$ and 100 N·s/m$^3$;
- the first sheet is made on the basis of paper, the second sheet being made on the basis of a planar web of mechanically bound fibers or bound by a resin, advantageously a ceramic material web;
- the heat fusible polymer fibers are advantageously fibers containing polyester, in particular fibers containing polyethylene terephthalate;
- the maximum penetration thickness of the polymer of the matrix into each sheet of porous material is less than 90% of the thickness of the sheet of porous material and is advantageously comprised between 50% and 90% of the thickness of the sheet.

BRIEF DESCRIPTION OF THE DRAWINGS

The invention will be better understood upon reading the description which follows, only given as an example and made with reference to the appended drawings, wherein:

FIG. 3 is a view of a heating unit for an assembly for manufacturing the part of FIG. 1.

FIG. 4 is a similar view to FIG. 3, of a molding unit of the manufacturing assembly;

FIGS. 5 to 9 illustrate different successive steps of the manufacturing method for the part according to the invention;

DETAILED DESCRIPTION OF THE ILLUSTRATED EMBODIMENT(S)

Figure 1:
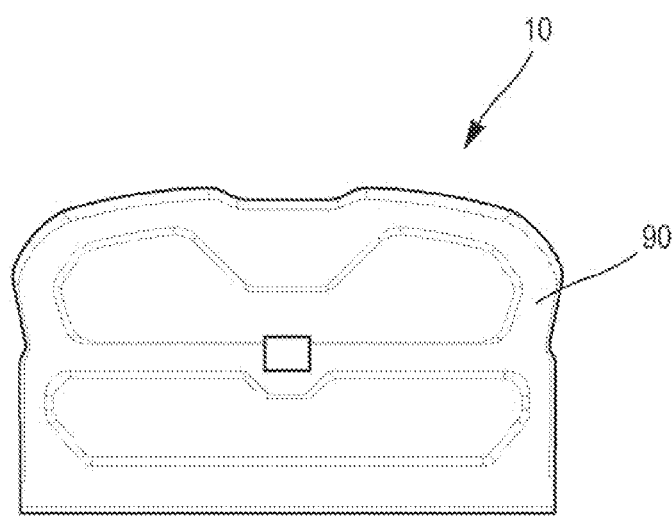
FIG. 1 is a top view of a first part of equipment of an automotive vehicle made with a first method according to invention.

A first part 10 of equipment of an automotive vehicle made by a method according to the invention is illustrated by FIG. 1.

The part 10 is advantageously a structuring part of the automotive vehicle, for example a shelf, such as a rear shelf hiding the trunk, a raised floor of a passenger compartment or trunk or a sub-engine.

Figure 2:
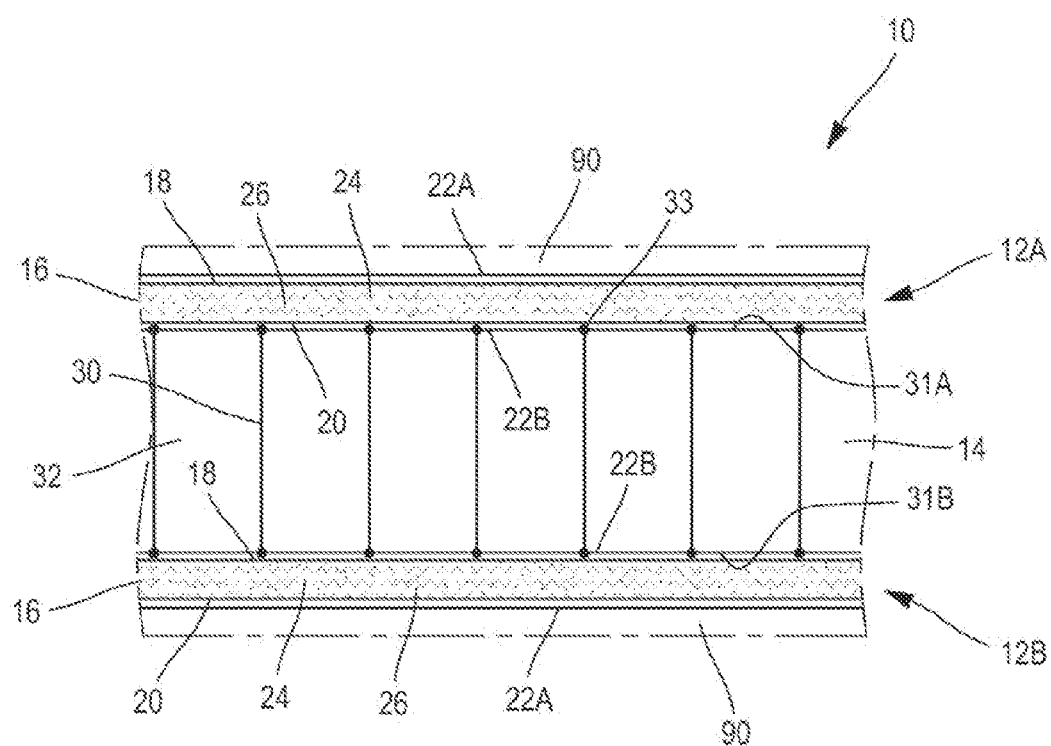
FIG. 2 is a partial sectional view of the part of FIG. 1.
Figure 6:
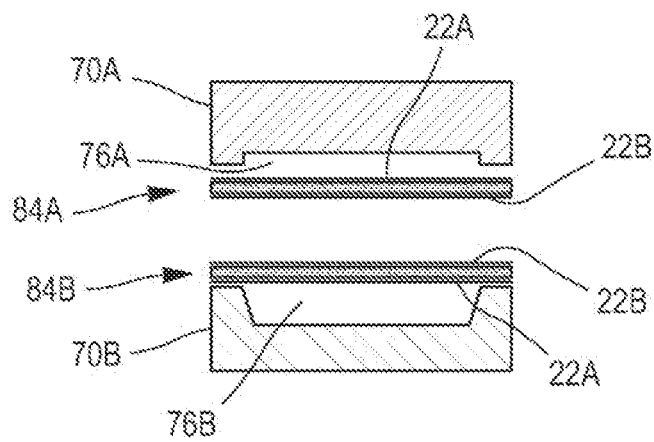

With reference to FIG. 2, the part 10 includes at least one first composite body 12A, 12B obtained with the method according to the invention.

In the example illustrated in FIG. 1 and in FIG. 2, the part 10 includes a first composite body 12A, a second composite body 12B and an intermediate spacer 14. The composite bodies 12A, 12B are attached onto opposite faces of the intermediate spacer 14.

As illustrated by FIG. 2, each composite body 12A, 12b comprises a composite central layer 16 having a first face 18 and a second face 20.

In the example illustrated in FIG. 2, the body 12A, 12B includes a first sheet 22A attached onto the first face 18 of the central layer 16 and a second sheet 22B attached onto the second face 20 of the central layer 16.

Each composite body 12A, 12B has a thickness of less than that of the spacer 14. More generally, the thickness of each composite body 12A, 12B is less than 3 mm and in particular comprised between 0.6 mm and 2 mm.

The surface mass of each composite body 12A, 12B is less than 3,000 g/m². It is in particular comprised between 600 g/m² and 1,800 g/m²;

The specific gravity of each composite body 12A, 12B is less than 1,900 kg/m³, and is in particular comprised between 500 kg/m³ and 1,500 kg/m³.

As this will be seen below, the central layer 16 includes a plurality of ceramic fibers 24 and a polymeric matrix 26 binding the ceramic fibers 24 together.

The ceramic fibers 24 are for example glass fibers.

They advantageously have a titer comprised between 1 dtex and 20 dtex. The ceramic fibers have an average length of less than 150 mm and a diameter of less than 50 micrometers.

The polymeric matrix is made from fibers of a heat fusible polymer.

The heat fusible polymer advantageously has a glass transition temperature, as measured by DSC ("Differential Scanning Calorimetry") according to the ISO 11357-2 standard, of more than 60° C. and in particular comprised between 75° C. and 85° C. It has a melting temperature in particular above 200° C., for example comprised between 240° C. and 260° C.

The heat fusible polymer is advantageously semi-crystalline. It has a crystallinity level of more than 20%, in particular comprised between 30% and 50%. The heat fusible polymer has a crystallization temperature measured according to the ISO 11357-1 standard, advantageously greater than 100° C., and in particular comprised between 140° C. and 160° C.

The polymeric matrix 26 is advantageously made on the basis of thermoplastic saturated polyester, different from a thermosetting unsaturated polyester. In one example, the saturated polyester is a polyethylene terephthalate (PET) obtained by polycondensation of terephthalic acid with ethylene glycol. Polyethylene terephthalate is for example modified with glycol. Alternatively, the polyester is a polybutylene terephthalate (PBT) formed by polycondensation of terephthalate acid and of butane-2, 3-diol.

Thus, the polymer forming the matrix has a melt flow index (melt flow index or MFI) at 260° C. with a rated load of 0.325 kg, as measured according to the ISO 1133:2005 method A standard, of more than 20 g/10 mins, and in particular comprised between 20 g/10 mins and 60 g/10 mins, advantageously between 30 g/10 mins and 60 g/10 mins.

Advantageously, the central layer 16 is obtained from a base layer comprising a mixture of ceramic fibers and of heat fusible polymer fibers. The ceramic fibers are dispersed in the heat fusible polymer fibers.

The mass proportion of heat fusible polymer in the layer 16 is comprised between 30% and 70% by mass and the mass portion of the ceramic fibers 24 in the layer 16 is comprised between 70% and 30% by mass. These percentages are calculated based on the total mass of the ceramic fibers 24 and of the heat fusible polymer matrix 26.

Initially, the titer of the polymer fibers is for example greater than 1 dtex and is comprised between 3.3 dtex and 6.7 dtex. The average length of the polymer fibers is advantageously less than 150 mm and is in particular comprised between 40 mm and 90 mm. The average diameter of the polymer fibers is for example comprised between 30 and 60 micrometers.

The base layer is advantageously manufactured with a method of the "airlay" type or dispersed with air, which has the advantage of easily treating mixtures of fibers of any kinds and is reinforced by needling.

Each sheet of porous material 22A, 22B has a thickness of less than that of the central layer 16. Advantageously, the thickness of each sheet 22A, 22B is much less than that of the central layer 16 and is for example less than 5% of the maximum thickness of the central layer 16.

Each sheet 22A, 22B has a surface mass of less than 100 g/m², in particular less than 80 g/m², advantageously less than 60 g/m².

Each sheet 22A, 22B is porous. It thus has a plurality of apertures which determine its wettability by capillarity. The wettability of each sheet 22A, 22B depends on the critical surface tension of the fibers which make it up, on the average dimension of the pores between these fibers and on the pressure exerted between the hot plates during pre-formation of each composite body 12A, 12B by adjusting these three parameters with regard to MFI and to the surface tension of the molten polymer, the penetration of the polymer inside the constitutive material of sheet 22A, 22B under an adjusted pressure is controlled.

In the bodies 12A, 12B according to the invention, the polymer forming the matrix penetrates as far as possible at least on half of the thickness of sheet 22A, 22B but without crossing them.

Thus, the sheets 22A, 22B ensure continuity with the matrix of the composite body 12A, 12B and have similar mechanical properties. They do not form an embrittled interface which would deteriorate the performances of the structures in which the composite bodies 12A, 12B will participate.

In a first embodiment, at least one sheet 22A, 22B consists of a sheet of paper. The paper has a surface mass of less than 80 g/m$^2$. For example it consists of plant, mineral, animal or manufactured synthetic fibers or of a mixture of these fibers by deposition and compression of fibers on a suitable forming device.

In the case of paper, the wettability is advantageously controlled by the surface tension resulting from the type of fibers used. The surface tension is advantageously less than 60 dynes/cm, more particularly comprised between 40 dynes/cm and 60 dynes/cm.

The wettability of a paper may be characterized with a test currently practiced in the paper-making industry according to the ISO 535 standard. This test consists of determining the mass of water absorbed per unit surface of paper, given by a COBB 60 index.

The wettability of the first sheet and/or of the second sheet as measured by its COBB 60 index determined according to the ISO 535 standard, is advantageously comprised between 50% and 100%, advantageously between 80% and 100% of the surface mass of said sheet.

A type of paper made from cellulose fibers and suitable for the invention is marketed under the brand Alios® by Gascogne Paper. This type of paper is proposed with surface masses varying from 28 g/m$^2$ a 70 g/m$^2$.

In another embodiment, at least one sheet 22A, 22B is made on the basis of a web of mechanically bound fibers or bound by a binder. At least one sheet 22A, 22B is in particular made on the basis of a web of ceramic fibers such as glass fibers.

This web has a surface mass of 100 g/m$^2$, and in particular comprised between 70 g/m$^2$ and 90 g/m$^2$.

For example it is formed from cut or continuous ceramic filamentary roves, in which case the gain on mechanical characteristics of the sandwiched structure is improved significantly (by an isotropic effect). When the filaments are cut, they have a length comprised between 50 mm and 250 mm.

The filaments are bound together with a resin, for example an acrylic or aminoplast resin, in particular applied by spraying. Alternatively, the filaments may be bound by a mechanical method such as sewing or weaving.

The mass percentage of resin in the web is generally less than 30%, and is in particular comprised between 5% and 30% based on the total mass of the resin and of the filaments. The filaments are all located in a same plane so that this web may also participate in the reinforcement of the composite, and the fibers present in the mat.

The web has a plurality of through-apertures which give it porosity. However, the web is able to retain the molten polymer stemming from the melting of the heat fusible fibers. The diameter of the filaments making up the web is less than 30 microns and is in particular comprised between 10 microns and 15 microns.

The thickness of the web is less than 1 mm and is in particular comprised between 0.5 mm and 0.8 m.

In the case of a glass web of this type, the wettability is advantageously controlled by the porosity. The porosity is measured by its airflow resistance (AFR). Thus, these webs are characterized by an AFR, airflow resistance as measured according to the ISO 9053 standard, of greater than 25 N·s/m$^3$ more particularly comprised between 25 N·s/m$^3$ and 100 N·s/m$^3$.

A web example which may be used is marketed under the registered trademark FORTEX® by JOHNS MANVILLE under reference SH80/1.

In still another embodiment, non-wovens of the spun-bonded type, melt blown type or even dry needled type may be used. The fibers making up the non-wovens have a melting temperature greater than that of the polymer used for making the mat 16. As an example, a spunbonded non-woven type suitable for the invention has a surface mass of 150 g/m$^2$ based on fibers of 3.3 dtex and having an AFR of more than 200 N·s/m$^3$.

Each sheet 22A, 22B is attached on one face 18, 20 of the layer, advantageously by partial impregnation of the heat fusible polymer of the polymeric matrix 26 in the sheet 22A, 22B.

For this purpose, the matrix 26 penetrates into the sheet 22A, 22B over a thickness advantageously greater than 50% of the thickness of the sheet 22A, 22B and in particular less than 80% of the thickness of the sheet 22A, 22B.

However, because of the presence of the sheets 22A, 22B, the central layer 16 is confined between the sheets 22A, 22B.

The sheets 22A, 22B advantageously cover the totality of the faces 18, 20 of the layer 16 in particular more than 95% of the extent of each face 18, 20.

In the case when the sheet 22A or 22B is a glass web, it advantageously forms a reinforcement of the composite since it is penetrated by the polymer which forms the matrix and this all the more since the glass fibers will be longer. It is even possible to modulate the percentage of thermoplastic fibers and of ceramic fibers initially present in the mat in order to take into account this additional provision of reinforcement fibers so as to modulate the final mechanical properties of the composite. Thus, identical properties are obtained by applying a mat with a lower weight by means of the reinforcement of the sheets 22A, 22B.

The second body 12B is similar to the first body 12A. It will not be described in more detail here.

The spacer 14 is interposed between the bodies 12A, 12B. Its specific gravity is for example comprised between 10 kg/m$^3$ and 500 kg/m$^3$ and more particularly 20 kg/m$^3$ and 50 kg/m$^3$.

Advantageously, the spacer 14 is made on the basis of a cell or honeycomb structure.

Thus, the spacer 14 has a plurality of walls 30 substantially perpendicular to a mean plane of the part 10, the walls 30 delimiting central spaces 32 with a closed contour forming the cells. Thus, each central space or cell 32 opens, facing a respective sheet 22B of a body 12A, 12B.

In an embodiment, the cells define polygonal, in particular hexagonal meshes.

The maximum transverse dimension of the polygonal meshes, taken to be parallel to a mean plane P of the part, is greater than 5 mm and is for example comprised between 5 mm and 20 mm, natively between 8 mm and 10 mm.

Alternatively, the meshes are corrugated. In this case, the amplitude of the corrugations is comprised between 5 and 15 mm and the pitch (distance between two corrugation crests) is comprised between 5 and 20 mm, advantageously 8 and 16 mm.

The spacer 14 is advantageously made in a lightweight material, such as paper or cardboard.

The surface mass of the spacer 14 is small. This mass is in particular less than 2,000 g/m$^2$ and is advantageously comprised between 50 g/m$^2$ and 1,500 g/m$^2$.

Preferably, this is less than 1,500 g/m$^2$ and is substantially comprised between 400 g/m2 and 1,200 g/m2.

Thus, the part 10 has adequate lightness, because of the low density of the spacer 14.

The spacer 14 advantageously has a thickness greater than 2 mm, and for example comprised between 2 mm and 100 mm, in particular between 5 mm and 30 mm.

The edge of the walls 30 delimits the opposite faces 31A, 31B of the spacer 14 on which are assembled the first body 12A and the second body 12B respectively.

In the part 10 illustrated in FIG. 2, a binder 33 is used for attaching the first body 12A onto the face 31A and the second body 12B onto the second face 31B. This binder is for example an adhesive, a film or another adhesive material compatible with the composition of the bodies 12A, 12B and of the spacer 14.

In the particular example of FIG. 1, the binder 33 is a film substantially covering the inner surface of the body 12A, 12B.

This binder may be part of the epoxy, acrylique, methacrylate, polyurethane or polyvinyl acetate families or of the family of acrylic adhesives of the wood adhesive type, such as amylaceous adhesives or those based on cellulose ester.

In an alternative, the spacer 14 is formed with a foam such as a polyurethane, polyolefin, polyester or polystyrene foam or further a foam based on foam wastes, or with a material such as expansed polystyrene, or cork or balsa, providing a surface mass of less than that of the first body 12A and of the second body 12B.

Moreover the spacer 14 may retain a honeycomb structure but of a nature other than cardboard, for example in aluminum in a polymeric material such as polyolefins or polyesters.

The sheet 22A or 22B, particularly if this is paper, forms an interface with the spacer 14, in the case when the spacer 14 is made in cardboard, itself on the basis of cellulose fibers. An adhesive of the wood adhesive type produces an optimum connection.

When the spacer 14 is made in another material, the cellulose proves to be compatible with a large number of different adhesive types, both hydrophilic and hydrophobic types.

The sheet 22A, 22B of the paper thus appears, when it is suitably wetted by the polymer present in the layers 16, as a multi-purpose interface in this type of sandwich structure.

An assembly 50 for manufacturing the part 10, intended to be applied in a first method according to the invention is illustrated by FIGS. 3 and 4.

The assembly 50 includes a heating unit 52 and a unit 54 for molding each body 12A, 12B, and the molding unit 54 being advantageously capable of achieving the assembling of the bodies 12A, 12B on the spacer 14, when the latter is present.

The heating unit 52 includes at least one wall 54A, 54B for supporting a base layer 56 and means 58 for heating the base layer 56.

In the example illustrated in FIG. 3, the unit 52 comprises at least two pairs of walls 54A, 54B facing each other intended to preform the first body 12A and the second body 12B respectively.

Each pair comprises two walls 54A, 54B facing each other delimiting together an intermediate space 60. Advantageously, the heating means 58 are positioned in each wall 54A, 54B for directly heating the layer 56 by contact.

Moreover, these heating means 58 are mounted on a low power press but nevertheless capable of exerting a force of 10 metric tons for allowing compression of the composite bodies 12A, 12B as well as wetting of the sheet 22A, 22B.

The molding unit 54 is formed with a mold 70 which includes a first hollow half-mold 70A and a second hollow half-mold 70B delimiting together a molding cavity 72.

The unit 54 further includes means for regulating the temperature of each half-mold 70A, 70B.

A first method for manufacturing the part 10 according to the invention will now be described.

The manufacturing method comprises a phase for preforming each composite body 12A, 12B and advantageously a phase for assembling each composite body 12A, 12B on the spacer 14.

The pre-formation phase comprises a step for providing a base layer 56 consisting of a mixture of ceramic fibers and of heat fusible polymer material fibers and then a step for heating and compressing the base layer 56 in order to melt the polymeric material fibers and have the molten polymer adhere to the ceramic fibers.

The exerted pressure allows transfer of calories on the one hand and compression of the composite bodies 12A, 12B to the desired density on the other hand.

In the provision step, a base layer 56 formed with ceramic fibers and with heat fusible polymer is provided. This base layer 56 is cut out so as to have an outer contour corresponding to the dimensions of the body 12A, 12B.

The base layer 56 was advantageously produced by an "airlay" or air dispersion method which gives the possibility of easily treating the mixtures of fibers of any kinds. It may also be produced via a standard dry route (carding followed by coating). After its constitution, the layer is always reinforced by needling for easier handling.

In the base layer 56, the mass proportion of heat fusible polymer fibers is advantageously comprised between 30% and 70%, and the mass proportion of ceramic fibers is comprised between 70% and 30%, as this was seen above.

The base layer 56 has a specific mechanical strength. It has a specific gravity, for example comprised between 80 kg/m$^3$ and 150 kg/m$^3$.

The thickness of the base layer 56 is then greater than 5 mm, and is for example comprised between 7 mm and 12 mm.

Next, each base layer 56 is covered with at least one sheet of porous material 22A, 22B as described above. Advantageously, the base layer 56 is interposed between two sheets 22A, 22B.

The porous material sheets 22A, 22B are for example made on the basis of paper or on the basis of a fiber web, as specified above. A first sheet 22A of porous material is positioned on a first face of the base layer 56, and a second sheet 22B of porous material is positioned on the second face of the layer 56.

Next, during the heating steps, each layer 56 provided with sheets 22A, 22B on its opposite faces is introduced into the heating unit 52, bearing against a wall 54A, 54B.

Each layer 56 is then heated up to a temperature above the melting temperature of the polymer making up the polymer fibers. This heating is applied for a dwelling time of more than 10 seconds, in particular comprised between 30 seconds and 45 seconds. This temperature is for example greater than 200° C., and in particular comprised between 250° C. and 270° C.

Each layer 56 is also compressed down to the required density, i.e. between 500 kg/m$^3$ and 1,500 kg/m$^3$. Thus, when the bodies 12A, 12B are made in the heating unit 52, compression is exerted on the layer 56 between the walls 54A, 54B for reducing the thickness of the layer 56. This reduction is for example of the order of a ratio of 5, advantageously a ratio of 10. Thus, when the base layer 56 initially has a thickness comprised between 12 mm and 7 mm, it subsequently comprises between the walls 54A and 54B of the heating unit, a thickness comprised between 2 mm and 0.5 mm, which approximately corresponds to the final required density for composite bodies.

The exerted pressure is relatively low. It is of the order of 6 bars which may be produced with a press of 10 metric tons. The presses associated with the mold have much greater capacities of the order of 100 to 200 metric tons.

The dwelling time in the heating unit 52 gives the possibility of heating the heat fusible fibers up to above the melting temperature. The polymer of the fibers is then at least partly in liquid form and impregnates the ceramic fibers. The sheets 22A and 22B avoid adhesion of the low viscosity polymer to the walls 54A, 54B.

In this step 4 of "pre-formation" of the layer 16 or of "pre-formation" of the composite body 12A, 12B, this will therefore be referred to as the preformed layer 16 or the preformed composite body 12A, 12B. Indeed, the composite body as such is not really made up since the polymer is still molten, does not form, strictly speaking, the matrix of a composite body.

This intermediate product may nevertheless be handled, thanks precisely to the presence of the sheets 22A, 22B, and may be easily extracted from the heating unit.

It should be noted that once it is removed from the heating unit, because of the resilience of the ceramic fibers and because the matrix is not made up, the preformed layer 16 may pick up thickness. The preformed composite body 12A, 12B therefore has a density approaching the final density of the composite body 12A, 12B. The density difference between the preformed composite body 12A, 12B and the final composite body 12A, 12B is thus comprised between 50% and 100%.

The surface tension of the molten polymer is for example comprised between 20 dynes/cm and 40 dynes/cm for ensuring efficient wetting of the ceramic fibers 24.

Surprisingly, the sheets 12A, 12B confine the polymer in liquid form and the ceramic fibers 24 and prevent the molten polymer or the ceramic fibers 24 from coming into contact with the walls 54A, 54B of the mold.

In the case when the sheet 22A, 22B are in a paper based on cellulose fibers, the wood fibers of the paper retain their integrity, taking into account the relatively short dwelling time (less than 50 seconds) and taking into account their confinement between the walls 54A, 54B. Subsequently, no supply of oxygen generates any inflammation of the paper making up the sheets 22A, 22B.

The molten polymer partly impregnates the thickness of the sheets 22A, 22B for allowing, after cooling, binding of the sheets 22A, 22B to the matrix 16 and ensuring the continuity of the stresses.

Simultaneously with this heating step, the spacer 14 cut out beforehand to the required dimensions is covered with binder on its two faces by means for example of roller coating machines.

In the embodiment described in FIG. 3, each preformed composite body 12A, 12B is introduced into the molding cavity 72 between two half-molds 70A, 70B at the same time as the spacer 14 which is itself positioned between both preformed composite bodies 12A, 12B. The walls 70A, 70B are advantageously maintained at a desired set constant temperature which advantageously corresponds to the crystallization temperature of the polymer present in the layer 56.

The walls 70A, 70B are then brought close to each other so as to both compress the preformed composite body 12A, 12B and ensure pressure between the composite bodies 12A, 12B and the spacer 14. The preformed composite body is maintained in contact with the walls 70A, 70B for a dwelling time of more than 10 seconds, and in particular comprised between 30 seconds and 45 seconds, this in order to ensure proper crystallization of the polymer. The cavity 72 subsisting between the walls 70A and 70B then corresponds to the desired thickness for the final part. In particular, the preformed composite body is compressed for forming a final body 12A, 12B with the desired definitive density, the matrix of the composite body 12A, 12B being formed by the recrystallized and solidified polymer.

Because of the prior compression during the heating step, which has accomplished the preforming of the composite body 12A, 12B, the pressure exerted by the walls 70A, 70B will be relatively low, which preserves the spacer 14.

The presence of the sheets 22A, 22B between the spacer and the preformed layer 16 distributes the pressure from the spacer on the preformed layer 16 in particular in the case when the spacer is a honeycomb and prevents the walls of the cells from penetrating into the preformed layer 16.

Thus, the part according to the invention 10 is not subject to "sagging" which may cause changes in density in the composite body 12A, 12B, leading to lesser performances of the whole of the sandwich structure.

The temperature of the walls 70A, 70B transmitted by conduction to the whole of the portions present in the mold may be utilized in order to accelerate the setting of the adhesive between the spacer 14 and the sheet 22A, 22B.

Figure 7:
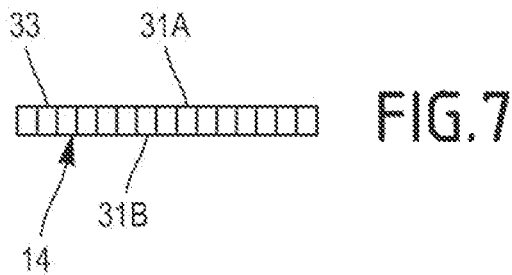
Figure 8:
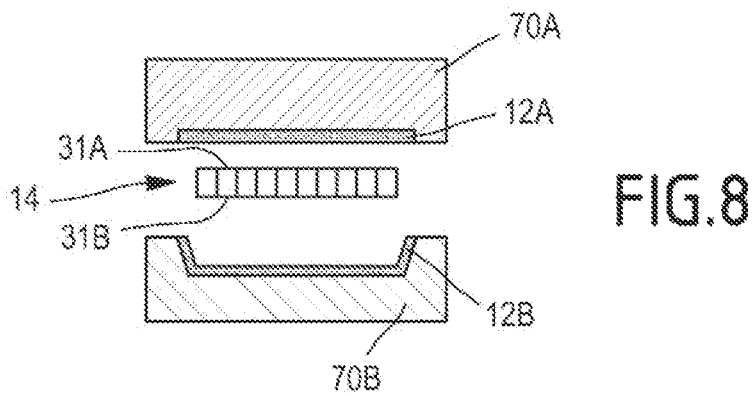
Figure 9:
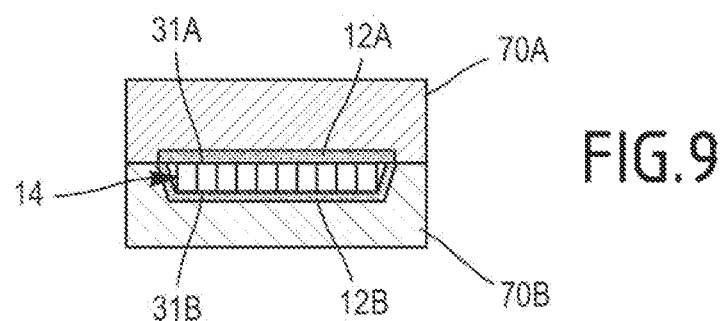

Next, as illustrated by FIG. 7, when the mold 70 is partly closed, with insertion of the spacer 14 between the preformed layers 16, each preformed layer 16 received between two sheets 22a, 22B then adopts a shape which is conjugate to that of the volume which receives it.

The polymer by hardening forms the matrix of the formed layer 16. Advantageously, at least partial recrystallization of the polymer occurs for generating better mechanical performances. Each body 12A, 12B is thus formed.

The pressure exerted on the sheets 22A, 22B promotes adhesive bonding and the connection of each composite 12A, 12B on the spacer 14. This is particularly the case when the sheets 22A, 22B are made in cellulose fiber paper, and when the spacer 14 is made in cardboard. In this case, a simple wood adhesive suitable for adhesively bonding cellulose fibers may be used for making the connection.

The viscosity and the surface tension of the adhesive used may be selected so that the adhesive penetrates by capillarity into the thickness of the sheets 22A or 22B on the thickness which will not have been penetrated by the polymer. Thus, at the contact points with the spacer 14, the sheets 22A or 22B are totally impregnated, either with the polymer or with the adhesive. This ensures continuity between the composite bodies 12A, 12B and the spacer 14 without producing an embrittlement area.

Next, the formed part 10 is extracted out of the mold 70.

The method according to invention therefore gives the possibility of obtaining particularly lightweight parts 10 and having excellent mechanical properties as compared with parts made with standard methods.

It should be noted that the steps for performing the composite bodies 12A, 12B as well as the step for impregnating the adhesive on the faces of the spacer 14 have substantially the same duration and are carried out during the molding step. The duration of a cycle is therefore by no means affected and is thereby established around 45 seconds which is particularly advantageous.

Further, the method is simple to apply since it only requires regulation at constant temperature of the mold and leads to parts 10 which are easy to handle. The risk of injuries for the user or for the operator of the method is reduced by allowing total confinement of the ceramic fibers 24 and of the polymeric matrix 26 between the sheets 22A, 22B.

Advantageously, the selection of a PET polymer with a high melt flow index leads to very advantageous mechanical properties.

At a temperature above 85° C. at which are conducted the flexural behavior tests, a thermoplastic polymer such as PET only exceeded by about 10° C. its glass transition temperature and remains below its crystallization temperature.

Its characteristics, in particular its elastic modulus, have varied very little as compared with what they are at room temperature unlike isotactic polypropylene from which are made the fibers such as those used in the case of Sommold. Isotactic polypropylene actually has a glass transition temperature of the order of $-10°$ C. and a crystallization temperature of 60° C.

This surprising effect is particularly observable with polymer fibers stemming from polyester with a high melt flow index (MFI). It is known that the elastic modulus of a polymer is correlated with the average molecular mass M which characterizes the average length of the macromolecular chains which make it up. The higher this molecular mass and the higher will be the modulus. The molecular mass M also determines the melt flow index. The lower the molecular mass M and the higher will be the melt flow index (the lower will be the hot viscosity).

Surprisingly, even the melt flow index is comprised between 30 g/10 mins and 60 g/10 mins which corresponds to elastic moduli of the order of 3,000 to 5,000 MPa alone, the mechanical properties of the body 12A, 12B are improved.

Figure 11:
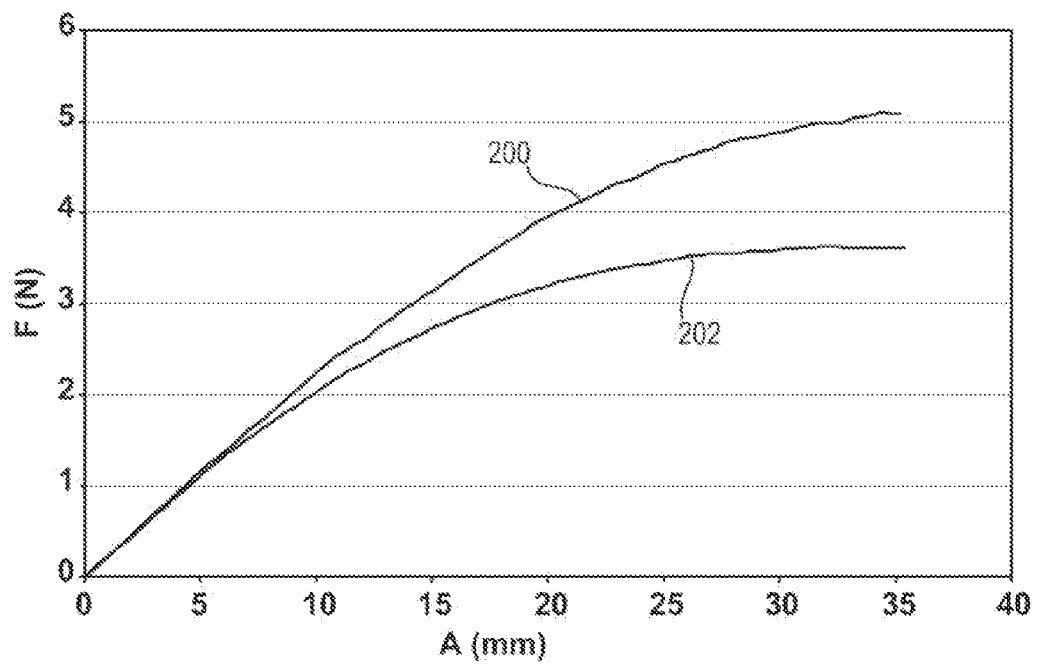
FIG. 11 illustrates the flexural behavior at 85° C. of a standard Sommold part as a comparison with a part made within the scope of the invention.

These results are illustrated by the curves of FIG. 11 where appear the illustrated behaviors of the elongation A under a given flexural force F of a composite body such as 12A, 12B according to the invention (curve 200) as a comparison with a composite body of the same weight and specific gravity made on the basis of Sommold (curve 202).

Without being bound by any theory, the inventors believe that the creep and wetting effect by the molten polymer of the glass fibers during the formation of a composite body such as 12A, 12B is preponderant particularly in the case of PET. Obtaining wetting and an extensive coating of the glass fibers with a polymer having inferior intrinsic mechanical properties in its solid form, but having very low viscosity (high melt flow index) under hot conditions during the process, improves the mechanical properties as compared with a coating which would remain partial with a polymer of high modulus but with a low melt flow index. This is promoted by the low chemical affinity between the glass and the polymer, which requires good quality coating.

The surface tension of a polymer decreases when the melt flow index increases. Glass fibers have a high physical surface tension which should make them very easily wettable by any type of polymer. However in the case of a method in which a mat is prepared by a textile "airlay" method, the sizing present on the polymer fibers is transferred onto the glass fibers which consequently acquire a much lower surface tension. A lowered surface energy of the molten polymer resulting from a high melt flow index therefore proves to be an additional asset.

Another parameter is the density of a composite body according to the invention obtained after molding. The maximum density of such a composite for example consisting of 50% of glass fibers (the density of which is of the order of 2.5 i.e. 2,500 kg/m$^3$) and of 50% of PET fibers (of a density of the order of 1, 35 i.e. 1,350 kg/m$^3$) is theoretically of the order of 1.9. By means of the method according to the invention, it is possible to approach this value under the low pressure exerted by the heated plate by using a polyester with a high melt flow index, (even with a low pressure of the order of 6.10$^5$ Pa).

However the use of the polymer with a melt flow index in the ranges described above in the case of a method of the "Sommold" type having very low hot viscosity and low surface tension is not entirely satisfactory. The polymer "wets" all the surfaces and adheres quite strongly thereto, even the surfaces of very low energies such as the silicone surfaces so that the heating method by contact is excluded.

The presence of the sheets 22A, 22B remedies this negative effect of the melt flow index by allowing heating by contact, while contributing to reinforcing the mechanical properties of the structures elaborated from composite bodies 12A, 12B and this without significantly increasing the weight.

In an alternative illustrated in dotted lines in FIG. 2, a cladding layer 90 may be added on both or either one of the bodies 12A, 12B.

In this case, an adhesive, such as a polyethylene adhesive for example may be deposited as a powder on a cladding layer 90 and/or on the sheets 22A, 22B. Then the cladding layer 90 is applied on the sheet 22A, 22B for adherence to this sheet 22A, 22B.

In an advantageous alternative, the cladding layer 90 is positioned in the mold 70, before introducing each layer covered by the sheets 22A, 22B. Assembling between the cladding layers 90 of each body 12A, 12B occurs during the formation of the part 10 in the mold 70, the temperature of the mold allowing the melting of the polyethylene powder which occurs around 120° C.

In another alternative, a three-layer polyethylene/polyamide/polyethylene film (not shown) is added into the mold 70 between a textile cladding layer 90 and the sheet 22A, 22B. This film plays the same role as the polyethylene powder by ensuring adhesive bonding of the cladding by melting the polyethylene constituents. But here the polyamide film retains its integrity and provides the seal towards water. The use of such a film allows the use of sheets of paper in a humid environment.

In another alternative, the sheet 22A, 22B is formed with a paper having a particular texture and a selected aspect, such as glossy paper for producing an esthetical effect.

The papers used may have been subject to various treatments making them hydrophobic on one of their faces such as those described in FR 2 925 910.

In another alternative, the sheets 22A and 22B intended to make up a same composite body such as 12A may be of different kinds. For example, the sheet 22A intended to be adhesively bonded against the spacer 14 may consist of paper while the sheet 22B intended to receive cladding and/or to thus make up the functional face, may be a glass web, which will limit the problems related to the possible presence of water.

In the latter case, it is particularly well understood that the sheets 22A, 22B do not only have the role of a processing aid allowing the making of the composite body 12A, 12B by contact heating but participate in increasing the mechanical performances of the part 10 by both an interfacing role for optimum adhesive bonding with the spacer 14 and an intrinsic reinforcing role for the composite body 12A, 12B.

Generally, the four sheets 22A, 22B present in the structure of a sandwiched material part 10 as described may be of different kinds and/or of different surface masses for better meeting the structural, functional or esthetical requirements of the targeted part.

The use of the sheets 22A, 22B may be generalized in the case of the making of composite materials with any type of thermoplastic polymers.

In particular, the matrix 16 may be formed with polyolefin or thermoplastic polyesters with low performances such as biosourced polyesters (for example polylactic acid: PLA). The quality of the interface due to the presence of the sheets 22A, 22B gives the possibility of making composites of the sandwich type with good performances at room temperature, particularly in their flexural behavior.

Further, this type of part 10 in a composite material according to the invention with a cardboard spacer is recyclable. Indeed, after milling, the cellulose components from the cardboard are easily dissociated for example by centrifugation. The portion corresponding to the sheets 22A, 22B which remains inseparable from the thermoplastic polymer component and which moreover only represents a very low mass percentage of the recycled material (about 2 to 5%) will behave like a filler.

This type of recyclate may in particular be used in applications of composite parts of the same type as those described in variable percentages depending on the level of required performances.

Figure 10:
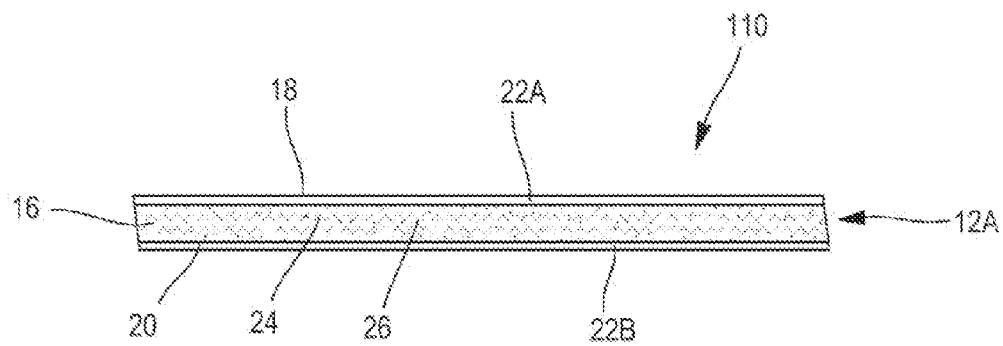
FIG. 10 illustrates a second part made by a method according to the invention.

A second part 110 according to the invention is illustrated by FIG. 10. The part 110 illustrated by FIG. 10 is for example intended to form an intermediate part in the manufacturing of an equipment of an automotive vehicle. This intermediate part 10 consists of a single composite body 12A comprising a composite central layer 16 as described above, on which are assembled a first sheet 22A and a second sheet 22B on the first face 18 and the second face 20 of the layer respectively. The polymer of the matrix 26 binding the ceramic fibers 24 of the central layer 16 together, partly penetrates into each of sheets 22A, 22B, while being confined between the sheets 22A, 22B for improving the mechanical properties or the body 12A and promoting attachment of the sheets 22A, 22B onto the layer 16.

Further as the sheets 22A, 22B remain porous since they are partly penetrated by the matrix, they form preferential sites for attaching other layers such as a cladding layer which may be impregnated with a binding material such as an adhesive.

In order to make such a part 110, the method is the same as the one described for obtaining a sandwich structure 10 with the difference that the mold is configured with a molding cavity 72 corresponding to the thickness of a single composite body 12 and that the preparation of a spacer 14 is unnecessary.

The invention claimed is:

1. A method for manufacturing an equipment part of an automotive vehicle comprising the following steps:
providing a base layer including ceramic fibers and heat fusible polymer fibers;
heating and compressing the base layer on at least one supporting wall for melting the hot melt polymer fibers and having the molten polymer adhere to the ceramic fibers in order to obtain a preformed layer;
confining the preformed layer in a pressurized mold in order to make up a formed layer,
wherein the method includes arranging a first sheet of porous material on a first face of the base layer and a second sheet of porous material on a second face of the base layer before the heating step, at least the first sheet of porous material being formed with paper, each sheet of porous material having a thickness of less than that of the formed layer, the sheets of porous material confining between them the molten polymeric material stemming from the heat fusible polymer fibers during the heating step, the sheets of porous material being bound to the formed layer after the step for making up the formed layer, in order to form a first composite body, wherein the method includes:
making a second composite body,
attaching the first composite body and the second composite body onto opposite faces of an intermediate spacer having cellulose fibers, said attaching step including adhesively bonding the first sheet of porous material of the first composite body against said intermediate spacer.

2. The method according to claim 1, wherein each sheet of porous material has a surface mass of less than 100 g/m².

3. The method according to claim 1, wherein the second sheet of porous material is formed with paper or a planar web of fibers bound mechanically or by a resin.

4. The method according to claim 1, wherein the surface tension of the first sheet and/or of the second sheet and/or of the second sheet is less than 60 dynes/cm.

5. The method according to claim 1, wherein the airflow resistance of the first sheet and/or of the second sheet is greater than 25 N·s/m³.

6. The method according to claim 3, wherein the second sheet of porous material comprises a planar web of ceramic fibers bound mechanically or by a resin.

7. The method according to claim 1, wherein the heat fusible polymer fibers are fibers containing polyester.

8. The method according to claim 1, wherein after the heating step, the maximum penetration thickness of the molten polymer in each sheet of porous material is less than 90% of the thickness of the sheet of porous material.

9. The method of claim 1, wherein:
the second composite body is made through the same steps as the first composite body, said second composite body including a first sheet of porous material formed with paper; and
the step of attaching the first composite body and the second composite body onto opposite faces of the intermediate spacer includes adhesively bonding the first sheet of porous material of the second composite body against said intermediate spacer.

10. An equipment part of an automotive vehicle, wherein the part includes at least one composite body including a layer formed with ceramic fibers bound together by a polymeric matrix obtained from heat fusible polymer fibers, the composite body comprising a first sheet of porous material formed with paper positioned on a first face of the formed layer, and a second sheet of porous material positioned on a second face of the formed layer, each sheet of porous material having a thickness of less than that of the formed layer, the matrix in polymeric material being confined between the sheets of porous material, each sheet of porous material being attached to the formed layer by an adhesive bond that comprises the polymer matrix and that is co-formed with the formed layer, wherein the equipment part further includes a second composite body and the first composite body and the second composite body are attached onto opposite faces of an intermediate spacer having cellulose fibers, wherein the first sheet of porous material of the first composite body is adhesively bonded against said intermediate spacer.

11. A part according to claim 10, wherein each sheet of porous material has a surface mass of less than 100 g/m².

12. The part according to claim 10, wherein each the second sheet of porous material is a planar web of fibers bound mechanically or by a resin.

13. The part according to claim 10, wherein the heat fusible polymer has a melt flow index at 260° C. of more than 20 g/10 mins.

14. The part according to claim 10, wherein the matrix obtained from heat fusible polymer fibers contains polyester.

\* \* \* \* \*